United States Patent [19]

Berchem

[11] Patent Number: 4,532,686
[45] Date of Patent: Aug. 6, 1985

[54] METHOD OF MAKING A PISTON BOTTOM

[75] Inventor: Rütger Berchem, Gelsenkirchen, Fed. Rep. of Germany

[73] Assignee: Berchem & Schaberg GmbH, Gelsenkirchen, Fed. Rep. of Germany

[21] Appl. No.: 503,317

[22] Filed: Jun. 10, 1983

[30] Foreign Application Priority Data

Jun. 16, 1982 [DE] Fed. Rep. of Germany ....... 3222582

[51] Int. Cl.³ .............................................. B23P 15/10
[52] U.S. Cl. .................................. 29/156.5 R; 29/557; 29/558; 29/DIG. 18; 29/DIG. 26; 92/220; 92/224; 123/193 P
[58] Field of Search .................. 29/156.5 R, 557, 558, 29/DIG. 18, DIG. 26; 92/220, 224; 123/193 P

[56] References Cited

U.S. PATENT DOCUMENTS

| 2,400,503 | 5/1946 | Harper, Jr. ............................ 92/220 |
| 2,539,903 | 1/1951 | Gruetjen .......................... 29/156.5 R |
| 3,152,523 | 10/1964 | Whitfield ....................... 123/193 P X |
| 3,222,761 | 12/1965 | Sabo ............................... 29/156.5 R |
| 3,235,946 | 2/1966 | Neu et al. ........................ 29/156.5 R |
| 3,613,521 | 10/1971 | Itano ............................ 29/156.5 R X |
| 3,915,141 | 10/1975 | Öttl et al. .................... 29/156.5 R X |
| 4,083,292 | 4/1978 | Goloff ................................ 92/220 X |

Primary Examiner—Howard N. Goldberg
Assistant Examiner—Ronald S. Wallace
Attorney, Agent, or Firm—Karl F. Ross; Herbert Dubno

[57] ABSTRACT

A piston bottom for large capacity internal-combustion engines is made by forging a saucer-shaped blank from refractory-forging steel and then in a second forging step transforming the saucer-shaped blank into a cup configuration with a planar rim of the blank being transformed into a cylindrical shoulder and an annular bulge of the blank being transformed into an annular boss for connecting the piston bottom of the cylindrical body of the piston. The blank has a convexity projecting on one side of the blank opposite that formed with the bulge.

5 Claims, 3 Drawing Figures

METHOD OF MAKING A PISTON BOTTOM

FIELD OF THE INVENTION

My present invention relates to a method of making a piston bottom and, more particularly, to a method of making a closed end or bottom of a piston for an internal-combustion engine especially a large Diesel engine, by forging.

BACKGROUND OF THE INVENTION

It is known to provide compound or assembled pistons for internal-combustion engines, especially large displacement Diesel engines, which comprise a generally cylindrical piston body which is of tubular or solid construction and which is terminated at its end directed toward the firing chamber with a so-called piston "bottom" which may be attached by bolts or by welding to the piston body. The connecting or piston rod is articulated to the piston body and the piston bottom is generally composed of a forgeable refractory steel. The compound piston construction thus allows the body of the piston or at least other parts thereof to be composed of less expensive materials.

The piston body itself generally has a configuration which can be described as a somewhat domed or bulging (outwardly convex) central portion, an inwardly concave formation corresponding to the outwardly domed portion, and a cylindrical shoulder along the periphery of the bottom which abuts the piston body and forms an outer surface which is more or less continuous therewith although grooves may be provided in the outer cylindrical surfaces of this shoulder and the body for sealing purposes.

The bottom thus has generally a cup-shape, open toward the body of the piston and can be provided within this cup with a substantially circular boss, ridge or hub at which the bottom is joined to the body.

As noted, this abutment can be by a weld, e.g. friction welding, or by bolting.

In general the piston body is formed from forgeable refractory steel although a good part of the shape must be applied by material-removal (machining) techniques which are expensive and time-consuming.

When the bottom is formed from a blank which is initially cast from alloys having refractory characteristics, the bottom is especially sensitive to the formation of segregations which tend to concentrate at the center of the bottom or in the shoulder. Such segregations bring about anisotropies which reduce the value of the bottom and may even make it worthless. Failure can occur prematurely in use and the problem is exacerbated when heavy machining must be done and hence a possibly unusable product fabricated at especially high cost.

While forgeable alloys have been used, the degree of forging of the finished product has been limited heretofore and indeed considerable machining was necessary even where the blank was initially forged.

Thus, whether the piston bottoms were primarily cast and machined or cast, forged and machined, or even simply forged from stock obtained by other steel fabrication processes, invariably considerable effort was expended in imparting the finished shape of the product by expensive machining steps which could also exacerbate stresses within the workpiece.

OBJECTS OF THE INVENTION

It is, therefore, the principal object of the present invention to provide an improved method of making a piston bottom whereby at least some of the above-described disadvantages are obviated.

Another object of this invention is to provide a method of making a piston body which minimizes the amount of material-removal machining which is required before the piston bottom is assembled onto the piston body.

Still another object of my invention is to provide a method of making low-cost, high quality, long-lasting piston bottoms, especially for internal-combustion engine pistons and most particularly for the pistons of large-displacement Diesel engines, whereby the abovementioned drawbacks are obviated, and especially anisotropy is avoided, or reduced.

SUMMARY OF THE INVENTION

These objects and others which will become apparent hereinafter are attained, in accordance with the invention, in a method of fabricating a generally cup-shaped piston body wherein an outwardly domed convex central portion is surrounded by a cylindrical shoulder projecting axially in the direction opposite the convexity of the central portion, and the cup-shaped structure is provided internally with an annular cylindrical boss or ridge for attachment purposes in the manner described, the method comprising a first forging step in which I impart generally the shape of a saucer to a blank, and a second forging step in which the final cup-shape is imparted thereto.

The saucer shape to which I refer generally comprises a recess into which the central portion of the blank bulges convexly and a generally planar rim surrounding this recess. On the opposite side of the saucer-shaped blank, a concavity is formed in the region of the domed or convex portion while an annular bulge extends around this concavity and in the second forging stage will be contracted to form the annular boss.

In the second forging stage, moreover, the planar rim of the saucer-shaped blank is formed into a right-angle cross section to define the annular shoulder which can project axially opposite the convexity previously mentioned to a greater extent than the annular boss which is simultaneously forged on the blank.

According to this invention, the saucer-shaped blank is forged from a refractory steel and preferably a so-called valve steel, e.g. the valve steel marketed under the commercial designation X45CRSI9. In general, I prefer to use refractory steels having up to 0.27% by weight carbon, 12 to 14% by weight chromium, 1.6 to 2.3% nickel, up to 0.5% manganese, up to 0.5% molybdenum, up to 0.5% silicon and 2.5 to 3.5% tungsten, the balance being iron and any unavoidable impurities which do not affect the refractory or forging properties, i.e. the balance is substantially iron.

The carbon content is preferably a minimum of 0.05% by weight, although I prefer to use at least 0.1% by weight.

Similarly, I prefer to use an alloy which does contain manganese, molybdenum and silicon, each in an amount of at least 0.01% with the preferred minimum being 0.05% by weight of these components.

According to another feature of the invention, following the second forging stage, the cup-shaped piston bottom is subjected to a homogenizing heat treatment which further reduces the tendency toward anisotropies and thus can be followed by a machining step in which surfaces may be faced to ensure that the bottom has the desired dimensional tolerances and grooves can be provided along the cylindrical surface.

The method of the invention has the important advantage that the piston bottoms fabricated in accordance with the invention possess the desired refractory properties without anisotripic characteristics which have caused premature failure heretofore. Materials can be used which are less costly than those which have had to have been employed heretofore to avoid such anisotropies and a cost of fabrication is markedly reduced. Since the piston bottoms are of especially high quality and long life, they may make up a smaller portion of the piston and indeed, pistons can be smaller and hence the combustion engine capacity can be increased, with a commensurate increase in the engine power.

While some machining may still be required, it is reduced to a minimum and consequently the fabrication cost is limited. It is possible in this regard, to limit the machining to the formation of the grooves for the piston rings.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
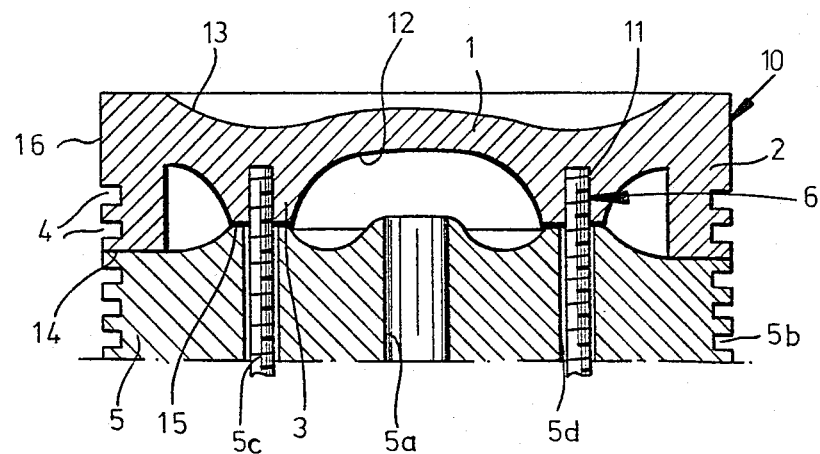
FIG. 1 is an axial section through a portion of a piston for a large-capacity Diesel engine, showing the piston bottom of the invention affixed to the piston body but omitting the piston rings and other structure conventional in the art.

From FIG. 1 it will be apparent that the finished piston comprises a generally cylindrical piston body 5 which can be formed with an axial bore 5a and circumferential grooves 5b, the latter receiving respective piston rings (not shown). The body 5 is connected by drawbolts 5c which traverse the bores 5d with a piston bottom generally represented at 10 and having internally threaded bores 11 formed in an annular boss 3.

The piston bottom, which is composed of a refractory forging steel, comprises an outwardly convex central portion 1 which coincides with an inner concavity 12 of the cup-shaped piston bottom. The base of the cup is formed with a recess 13 into which the convexity 1 bulges while the peripheral wall of the cup is formed by a shoulder 2 extending axially in the opposite direction from the convexity and projecting to a greater extent than the annular boss 3.

The shoulder 2 is provided with circumferential grooves 4 which are machined in a forged body to receive the piston rings and the bottom may be also machined for proper fit along the surfaces 14 and 15 of the shoulder of the boss and along the cylindrical surface 16 to assure a flush relationship of this surface with the surface of the body 5. Instead of the threaded connection formed at 6 between the drawbolts and the piston bottom to hold the assembly together, the piston body may be welded to the piston bottom, e.g. by friction welding.

Figure 2:
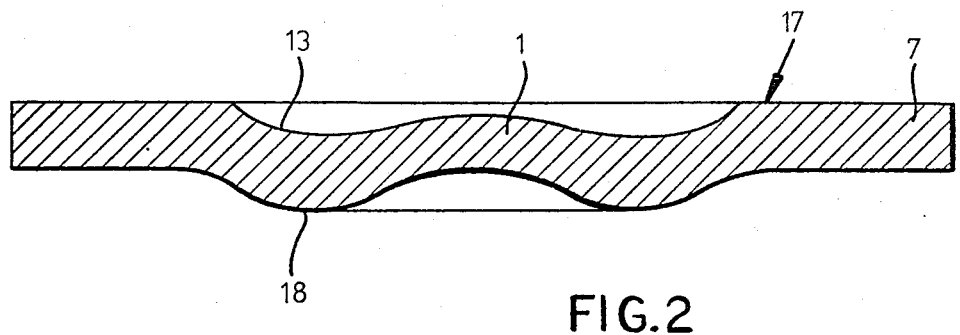
FIG. 2 is a cross sectional view showing the saucer-shape blank formed by the first forging stage of the invention.

The first step in the forging of the piston bottom is a forging of the flat-cast plate of refractory forging steel to the shape shown in FIG. 2, i.e. a saucer-shaped blank 17.

This blank comprises a planar rim 7, the depression 13 previously mentioned, the bulge 1, and an annular hump 18 which contains the material which is forged in a more compact shape in producing the annular boss 3.

Figure 3:
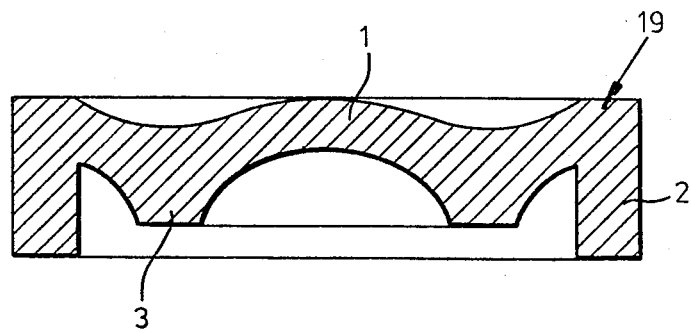
FIG. 3 is a cross sectional view showing the cup-shape member which is fabricated in the second forging step.

The second and final forging step transforms the blank 17 into the cup-shaped structure 19 of FIG. 3, i.e. reshapes the bulge 18 into the boss 3 and bends the flat rim 7 into the shoulder 2.

With minimum machining as described and after a homogeneous heat treatment, the cup of FIG. 3 can be drilled and tapped to provide the bores 11 and assembled to the piston body.

SPECIFIC EXAMPLE

A plate is formed by casting a forgeable refractory (heat-resistant) steel having the following composition:
0.15% by weight carbon
13.0% by weight chromium
2.0% by weight nickel
0.2% by weight manganese
0.3% by weight molybdenum
0.25% by weight silicon
3.0% by weight tungsten
balance substantially iron.

The blank was forged conventionally to the saucer shape of FIG. 2 and then forged to the shape of FIG. 3.

Following the second forging step, the resulting cup was homogenized by maintaining it at a temperature of 750° C. for six hours. The body was then machined in the manner described. The piston bottom had a substantially greater life than cast piston bottoms and was found to be substantially free from anisotropy.

I claim:

1. A method of making a piston bottom for an internal-combustion engine piston, comprising the steps of:
    forging a saucer-shaped blank from a refractory forging steel with a flat blank rim, a dished recess in said blank on one side thereof, a central convexity projecting into said recess and, on the opposite side of said blank, an annular bulge;
    forging said saucer-shaped blank into a cup configuration whereby said rim is transformed into a cylindrical shoulder extending axially in the direction opposite that in which the convexity projects while shaping said bulge into an annular boss for attachment to a piston body on assembly of said piston; and
    subjecting the cup formed in the second forging step to a homogenizing heat treatment.

2. The method defined in claim 1 wherein said refractory steel has the following composition:
    up to 0.2% by weight carbon,
    12 to 14% by weight chromium,
    1.6 to 2.3% by weight nickel,
    up to 0.5% manganese,
    up to 0.5% molybdenum,
    up to 0.5% silicon,
    2.5 to 3.5% tungsten,
    the balance substantially iron.

3. The method defined in claim 1, further comprising the step of machining circumferential grooves on said shoulder to receive piston rings.

4. The method defined in claim 3, further comprising drilling and tapping bores in said boss for attachment of said bottom to said body.

5. The piston bottom made by the method defined in claim 1.

* * * * *